US005438572A

United States Patent [19]

Rauscher

[11] Patent Number: 5,438,572

[45] Date of Patent: Aug. 1, 1995

[54] MICROWAVE NON-LOGARITHMIC PERIODIC MULTIPLEXER WITH CHANNELS OF VARYING FRACTIONAL BANDWIDTH

[75] Inventor: Christen Rauscher, Alexandria, Va.

[73] Assignee: The United States of America as represented by the Secretary of the Navy, Washington, D.C.

[21] Appl. No.: 10,948

[22] Filed: Jan. 29, 1993

[51] Int. Cl.$^6$ .......................... H04J 1/08; H01P 5/12

[52] U.S. Cl. .................................... 370/123; 333/126; 343/792.5

[58] Field of Search .................. 370/69.1, 71, 72, 123, 370/30, 50, 57; 333/126, 128, 129, 132, 134, 135, 136, 204, 246; 343/792.5

[56] References Cited

U.S. PATENT DOCUMENTS

| | | | |
|---|---|---|---|
| 2,816,270 | 12/1957 | Lewis | 333/126 |
| 4,029,902 | 6/1977 | Bell, Jr. et al. | 370/123 |
| 4,091,344 | 5/1978 | Latourette | 333/134 |
| 4,777,459 | 10/1988 | Hudspeth | 333/135 |
| 4,815,075 | 3/1989 | Cameron | 370/123 |
| 4,839,894 | 6/1989 | Rudish et al. | 333/126 |
| 5,101,181 | 3/1992 | Rauscher | 333/134 |
| 5,233,609 | 8/1993 | Hunton | 370/123 |

OTHER PUBLICATIONS

Rauscher, "*Logarithmic-Periodic Contiguous-Channel Microwave Multiplexer*", IEEE MIT-5 Digest, pp. 675–678, 1989.

*Primary Examiner*—Hassan Kizou

*Attorney, Agent, or Firm*—Charles J. Stockstill; Thomas E. McDonnell

[57] ABSTRACT

A multiplexer includes a first channel segment having first components derived from a first logarithmic-periodic multiplexer circuit. The first channel segment receives a composite signal from a composite-signal port, selects a first channel having a first bandwidth and first center frequency from the composite signal, and directs a first channelized signal to the first channelized-signal port responsive to the first channel. In addition, the multiplexer incenses a second channel segment, connected to the first channel segment and having second components derived from a second logarithmic-periodic multiplexer circuit. The second channel segment receives the portions of the composite signal from the composite-signal port via the first segment, selects a second channel having a second bandwidth and second center frequency from the composite signal, and directs a second channelized signal to a second channelized-signal port responsive to the second channel.

16 Claims, 7 Drawing Sheets

MICROWAVE NON-LOGARITHMIC PERIODIC MULTIPLEXER WITH CHANNELS OF VARYING FRACTIONAL BANDWIDTH

BACKGROUND OF THE INVENTION

1. Field of the Invention

The present invention relates to the construction and design of microwave multiplexers with contiguous or non-contiguous frequency channels and, in particular, to the construction and design of microwave multiplexers with channels exhibiting channel center frequencies that vary from one channel to the next in a monotonic fashion and exhibiting fractional bandwidths that vary from one channel to the next in a systematic, but otherwise arbitrary, user-defined manner. The present invention provides a non-logarithmic-periodic multiplexer which multiplexes/demultiplexes channels having various fractional bandwidths by use of one or more idealized infinite-array multiplexer prototypes for designing network segments which provide frequency selective filtering between individual composite-signal ports and associated channelized-signal ports.

2. Description of the Related Art

Presently, frequency multiplexers having channel fractional bandwidths which vary from one channel to the next are difficult to design and implement and generally require sophisticated computer-aided design tools. The prior art on constant-fractional-bandwidth multiplexers includes a logarithmic-periodic microwave multiplexer which can be efficiently designed and implemented as an array of logarithmic-periodically scaled substructures or segments. Logarithmic periodicity rigidly links circuit parameter values and characteristic frequencies defining a particular multiplexer segment to corresponding quantities of neighboring segments through a fixed logarithmic-periodic scaling factor. Accordingly, the logarithmic-periodic multiplexer of the prior art is made up of segments which share the same topology and which have circuit element values rigidly linked to one another from one channel segment to another channel segment through a fixed scaling factor. This basically confines independent design variables to those of a single segment and allows optimization of the entire logarithmic-periodic multiplexer by only requiring the optimization of one channel segment of the multiplexer. All other segments are merely frequency-scaled replicas of the one reference segment with their respective design parameters being implicitly determined by the reference segment parameters through the fixed frequency scaling factor.

What is needed is a non-logarithmic-periodic multiplexer which is more suitable than the prior-art logarithmic-periodic microwave multiplexer for multiplexing/demultiplexing contiguous or noncontiguous frequency channels whose fractional bandwidths are allowed to vary from one channel to the next in a systematic, but otherwise arbitrary, user-defined manner. In addition, what is also needed is a non-logarithmic-periodic multiplexer which limits the number of variables to be optimized to avoid dimensionality concerns that burden conventional optimization approaches for designing multiplexers. Further, what is needed is a non-logarithmic-periodic multiplexer whose array of channel segments may be arbitrarily expanded without materially degrading the performance of previously incorporated channels in the channel array.

SUMMARY OF THE INVENTION

It is therefore, an object of the present invention to provide a non-logarithmic-periodic multiplexer which can be efficiently and effectively designed to implement frequency multiplexing/demultiplexing with contiguous or non-contiguous channels whose fractional bandwidths vary from one channel to the next in a systematic, but otherwise arbitrary, user-defined manner.

It is another object of the present invention to provide a non-logarithmic-periodic multiplexer which exploits the elegance and efficiency of the logarithmic-periodic approach while eliminating the equal-fractional-bandwidth restriction of the logarithmic-periodic multiplexer.

Another object of the present invention is to provide a non-logarithmic-periodic multiplexer which conceptually views each of its specified channels, one at a time, as a reference channel of a whole separate idealized infinite-array logarithmic-periodic multiplexer prototype of a respective fractional bandwidth. Each of the specified reference channel segments, which is designed according to the logarithmic-periodic approach, are then isolated from their respective prototype circuits and combined to form a new non-logarithmic-periodic structure, with individual channel segments arranged within the structure so as to establish from one channel to the next a sequence of channel center frequencies that vary monotonically.

It is an additional object of the present invention to provide a non-logarithmic-periodic multiplexer which multiplexes/demultiplexes constant-absolute-bandwidth channels to provide constant-absolute-bandwidth multiplexing/demultiplexing.

In carrying out the above objects of the present invention, there is provided a non-logarithmic-periodic multiplexer which includes a first channel segment having first components derived from a first logarithmic-periodic multiplexer prototype, where in the demultiplexing mode the first channel segment receives a composite signal from a composite-signal port, selects a first channel frequency band having a first bandwidth and first center frequency from the composite signal, and forwards a first channelized signal to the first channelized-signal port responsive to the first channel. In addition, the multiplexer includes a second channel segment, connected to the first channel segment and having second components derived from a second logarithmic-periodic multiplexer prototype. The second channel segment receives a composite signal from a composite-signal port, selects a second channel frequency band having a second bandwidth and second center frequency from the composite signal, and forwards a second channelized signal to a second channelized-signal port responsive to the second channel. Further channel segments may be added in analogous fashion.

These, together with other objects and advantages which will be subsequently apparent, reside in the details of construction and operation, as more fully hereinafter described and claimed, reference being had to the accompanying drawings forming a part hereof, wherein like reference numerals refer to like parts throughout.

BRIEF DESCRIPTION OF THE DRAWINGS

FIG. 1(*b*) is a block diagram of the general structural configuration of the network blocks shown in FIG. 1(*a*) of the present invention;

DESCRIPTION OF THE PREFERRED EMBODIMENT

The non-logarithmic-periodic multiplexer, which is the present invention, is—unlike the prior art logarithmic-periodic microwave multiplexer—suitable for multiplexing/demultiplexing contiguous or non-contiguous frequency channels whose fractional bandwidths vary from one channel to the next in a systematic, but otherwise arbitrary, user-defined manner. The non-logarithmic-periodic multiplexer of the present invention circumvents the dimensionality problems typically encountered in conventional design approaches by using techniques which are based on logarithmic periodicity. The present invention designs or constructs a segment for each channel to be multiplexed/ demultiplexed which is a frequency-transformed version of another channel segment. Accordingly, the number of variables to be optimized for a given multiplexer are limited to variables of one representative segment plus a small number of channel-dependent variable transformation parameters for each channel segment, thereby virtually eliminating dimensionality concerns that burden conventional optimization approaches for designing multiplexers. The non-logarithmic-periodic microwave multiplexer of the present invention is not based on each channel being integrated one at a time until the channel array is complete for multiplexing/demultiplexing, and therefore, avoids having to cope with interference from new channels being added to the channel array which typically affect the performance of previously incorporated channels in the channel array.

Figure 1A:
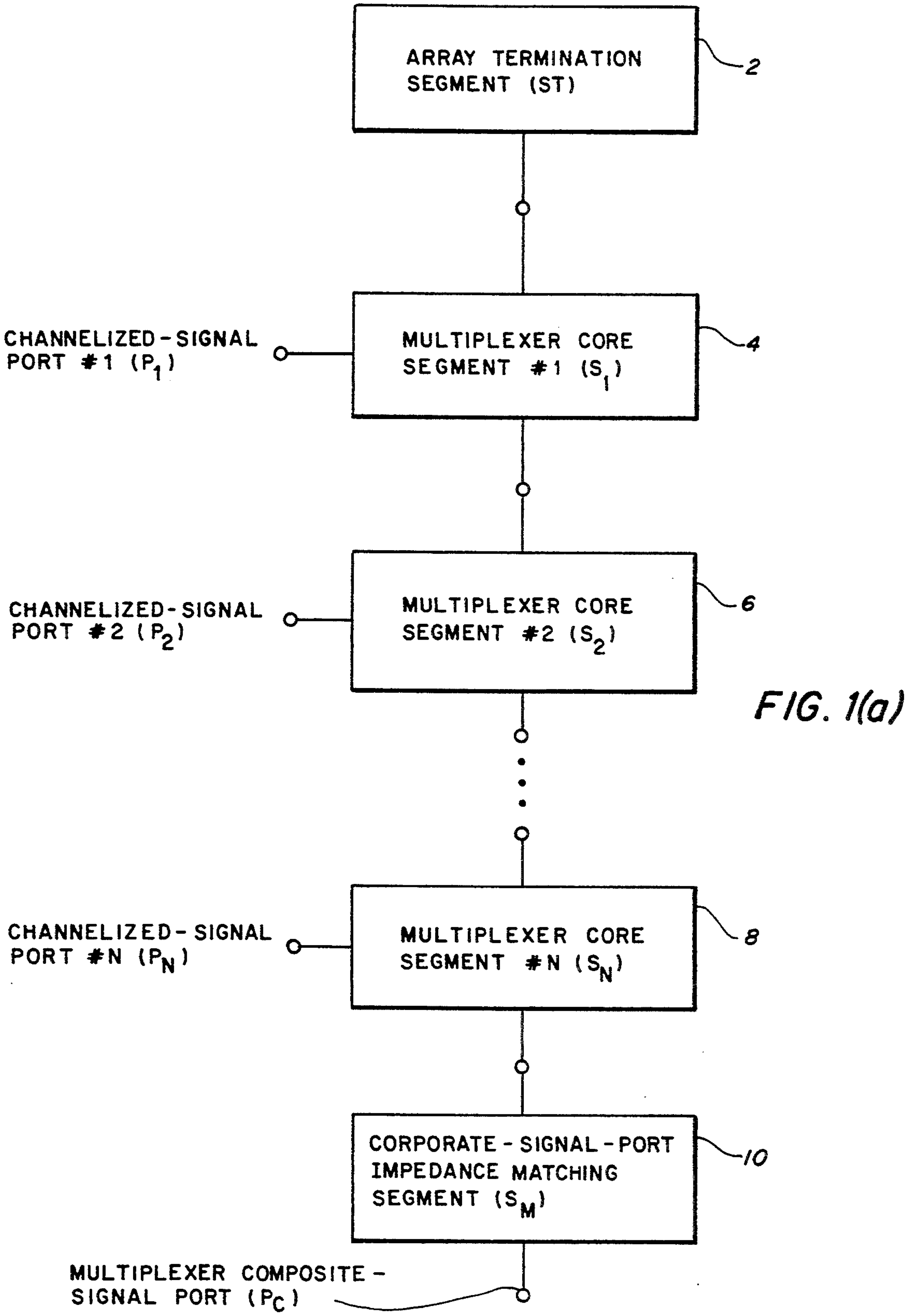
FIG. 1(*a*) is a block diagram of the general structural configuration of the present invention.
Figure 1B:
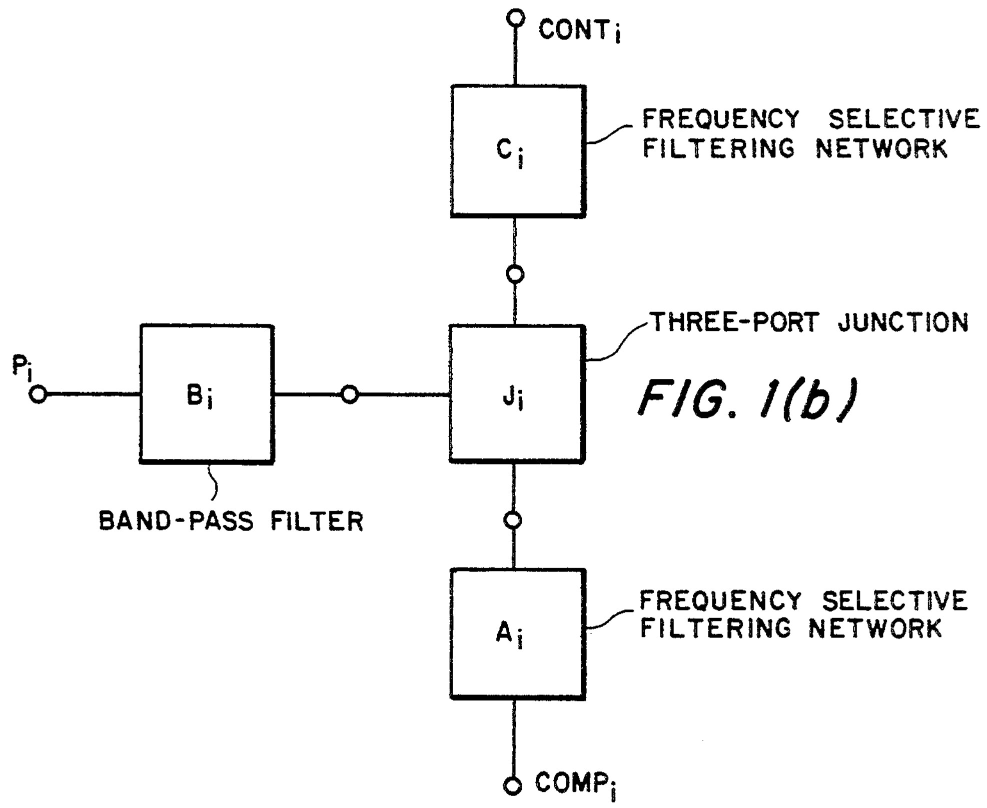

The basic construction of the non-logarithmic-periodic multiplexer of the present invention is illustrated in FIG. 1(*a*). FIG. 1(*a*) shows a one-port array termination segment $S_T$ connected to a three-port multiplexer core segment $S_1$. Segment $S_1$ is connected to a second core segment $S_2$. The core segments are cascaded together for up to N such segments. The Nth core segments $S_N$ is then connected to an impedance matching segment $S_M$. The above general construction of the non-logarithmic-periodic multiplexer of the present is conventional as described in U.S. Pat. No. 5,101,181 which is incorporated herein by reference.

In U.S. Pat. No. 5,101,181, the logarithmic-periodic principle, formerly developed for wideband antenna purposes, is put to use in the design of a microwave multiplexer circuit with equal fractional bandwidth channels. The approach, which is applicable to both contiguous-band and non-contiguous-band situations distinguishes itself by its ability to cope with almost any number of channels, while requiring only a minimum set of design variables. A logarithmic-periodic multiplexer circuit in its pure form comprises an infinite assembly of systematically scaled network segments, with each of these associated with a different multiplexer channel which may be in use or not used. According to logarithmic-periodic principles, the circuit parameter values and characteristic frequencies defining a particular segment are rigidly linked to the corresponding quantities of neighboring segments through a logarithmic-periodic scaling factor. For contiguous multiplexers, this factor is equal to unity plus the specified fractional bandwidth. The scaling factor in U.S. Pat. No. 5,101,181 can therefore be arrived at in an extremely simple consideration of the proposed bandwidth and center frequencies. The scaling factor is a free design variable in the design of logarithmic-periodic multiplexers. All frequency-dependent circuit element values (such as transmission line lengths, capacitance values, inductance values, etc.) in each segment are scaled by the same factor from one segment to the next so that the impedances and scattering parameters from one segment to the next remain identical in value when evaluated, respectively, at reference frequencies related to each other by the logarithmic-periodic scaling factor.

The object of U.S. Pat. No. 5,101,181 is to provide that all segments in the logarithmic-periodic structure have identical topologies with circuit element values rigidly linked to one another from segment to segment through the fixed scaling factor. Once a segment is defined, essentially the entire logarithmic-periodic multiplexer circuit is defined. A small set of parameters pertaining to a specific segment defines the whole logarithmic-periodic circuit, independent of the number of channels involved. This is particularly valuable when dealing with large numbers of multiplexer channels, because logarithmic periodicity automatically guarantees broadband performance and exact frequency scaling of the equal-percentage-bandwidth channel responses.

The logarithmic-periodic rule thus provides simultaneous optimization of the entire logarithmic-periodic structure.

Since a logarithmic-periodic structure of U.S. Pat. No. 5,101,181 involves, in principle, an infinitely large circuit, it is necessary to construct boundaries for the region of the circuit of interest. This can be achieved by allowing all segments not directly associated with designated channels to be represented by appropriately chosen equivalent substitution networks. One of these substitutions involves the hypothetical converging infinite cascade of dispensable high-frequency segments, which are replaced by a two-port equivalent impedance-matching segment, corresponding to the impedance-matching segment $S_M$ found in FIG. 1(*a*) of this invention. By the use of numerical-based approximation and synthesis techniques, the impedance-matching segment is designed to mimic the composite characteristics of the deleted portion of the original infinite structure. A substitution circuit may contain a continuation of the logarithmic-periodic structure by one or two additional segments, one of their ports being terminated by a dummy load. It should be noted that the additional segments are also logarithmic-periodically scaled. An equivalent one-port substitution circuit, corresponding to segment $S_T$ shown in FIG. 1(*a*) of this invention, is used to replace the diverging array of segments beyond the lowest frequency channel of interest, and to emulate for the core portion of the multiplexer the truncated portion of the array extended towards infinity.

In this invention, each of the core segments $S_1$–$S_N$ of the non-logarithmic periodic multiplexer are preferably three-port networks which may be further decomposed into two-port sections $A_i$, $B_i$, and $C_i$, and three-port junction $J_i$ as illustrated in FIG. 1(*b*). The $B_i$ section represents channelizing filters that are used to primarily define the individual channel frequency responses. Sections $A_i$ and $C_i$ also help define the individual channel frequency responses but are mainly tasked with forming a trunk distribution cascade for signal distribution and impedance transformation. In the present invention, section $B_i$ is preferably a conventional bandpass filter. $A_i$ and $C_i$ are made up of conventional passive circuit elements and preferably one of $A_i$ and $C_i$ will be a conventional frequency selective filtering network to help shape channel bandpass characteristics and help prevent unwanted out-of-band spurious channel responses. Junction $J_i$ can be either a simple three-way connection, as it is in conventional multiplexers of the manifold type, or it may contain more general three-port elements such as directional couplers or circulators. It should be noted that the core segments $S_1$–$S_N$ are not limited to a construction with three two-port subnetworks and one three-port subnetwork and that the core segments may contain any number of two-port and multiport subnetworks, including means for providing feed-forward and feedback signal paths within the core segment.

The circuit components of the termination segment $S_T$, core segments $S_1$–$S_N$ and matching segment $S_M$ may include circuit elements such as transmission line segments, lumped circuit elements, active components, ferrite elements, superconductors and any other active or passive reciprocal or nonreciprocal components. The three-port core segments $S_1$–$S_N$ are specifically tasked with providing frequency selective filtering between respective individual composite-signal ports and associated channelized-signal ports, as well as between composite-signal ports and connection points to subsequent subnetworks.

The present invention revolves around the utilization of multiplexer structures with topologies analogous to topologies disclosed for the logarithmic-periodic multiplexer of the prior art, but applied to non-logarithmic-periodic situations using frequency transformations. This extension encompasses a larger number of important multiplexer applications which cannot use the logarithmic-periodic multiplexers of the prior art. For example, the present invention is able to provide a non-logarithmic-periodic multiplexer which provides constant-absolute-bandwidth multiplexing/demultiplexing which is important for use in commercial and military communication systems.

Figure 2:
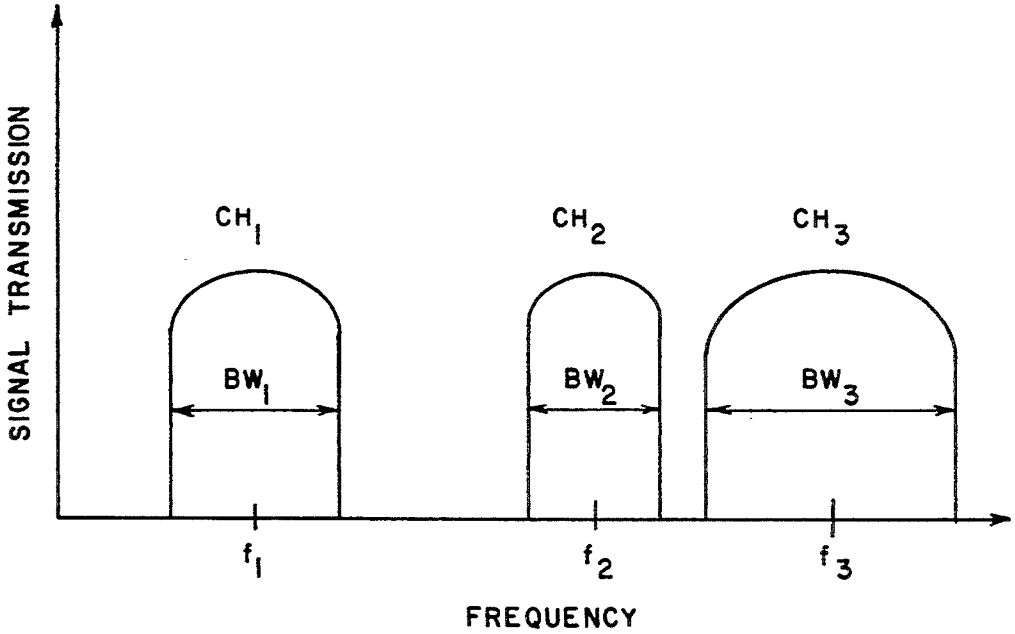
FIG. 2 is a spectrum diagram of a frequency plot showing various center frequencies and bandwidths which are used to conceptually describe the principles of the present invention.

Conceptually, the non-logarithmic-periodic multiplexer of the present invention may be arrived at by viewing each of the specified channels as a reference channel with the desired bandwidth and center frequency of an entire separate idealized infinite-array logarithmic-periodic multiplexer prototype having a respective fractional bandwidth. Once a separate logarithmic-periodic multiplexer has been designed for each channel to be used in the multiplexer using conventional logarithmic periodic techniques, these individual reference channel segments are then taken and combined to form a new non-logarithmic-periodic array. Starting from the composite-signal side of the resultant structure, the reference segments are stacked together in a fashion that establishes a sequence of monotonically decreasing channel center frequencies, with the highest-frequency segment ending up closest to the multiplexer composite-signal port. For example, as illustrated in the spectrum diagram of FIG. 2, three separate channels $CH_1$, $CH_2$ and $CH_3$ may be desired, each having bandwidths of $BW_1$, $BW_2$, and $BW_3$, respectively. Each of these three bandwidths are centered around frequencies $f_1$, $f_2$, and $f_3$, respectively. Thus, in order to design the non-logarithmic-periodic multiplexer of the present invention to multiplex/demultiplex these channels, individual conventional constant-fractional-bandwidth logarithmic-periodic multiplexer prototypes are designed for each of channels $CH_1$, $CH_2$ or $CH_3$ having reference channel responses of bandwidths $BW_1$, $BW_2$, and $BW_3$, respectively, and with center frequencies $f_1$, $f_2$, and $f_3$, respectively. The reference channel network segments of these individual conventional infinite-array logarithmic-periodic multiplexer prototypes are subsequently extracted from respective prototype circuits and connected together to arrive at the non-logarithmic-periodic multiplexer of the present invention, with all multiplexer core segments being of same topology and arranged to form an array with channel center frequencies varying monotonically across the array.

Figure 3:
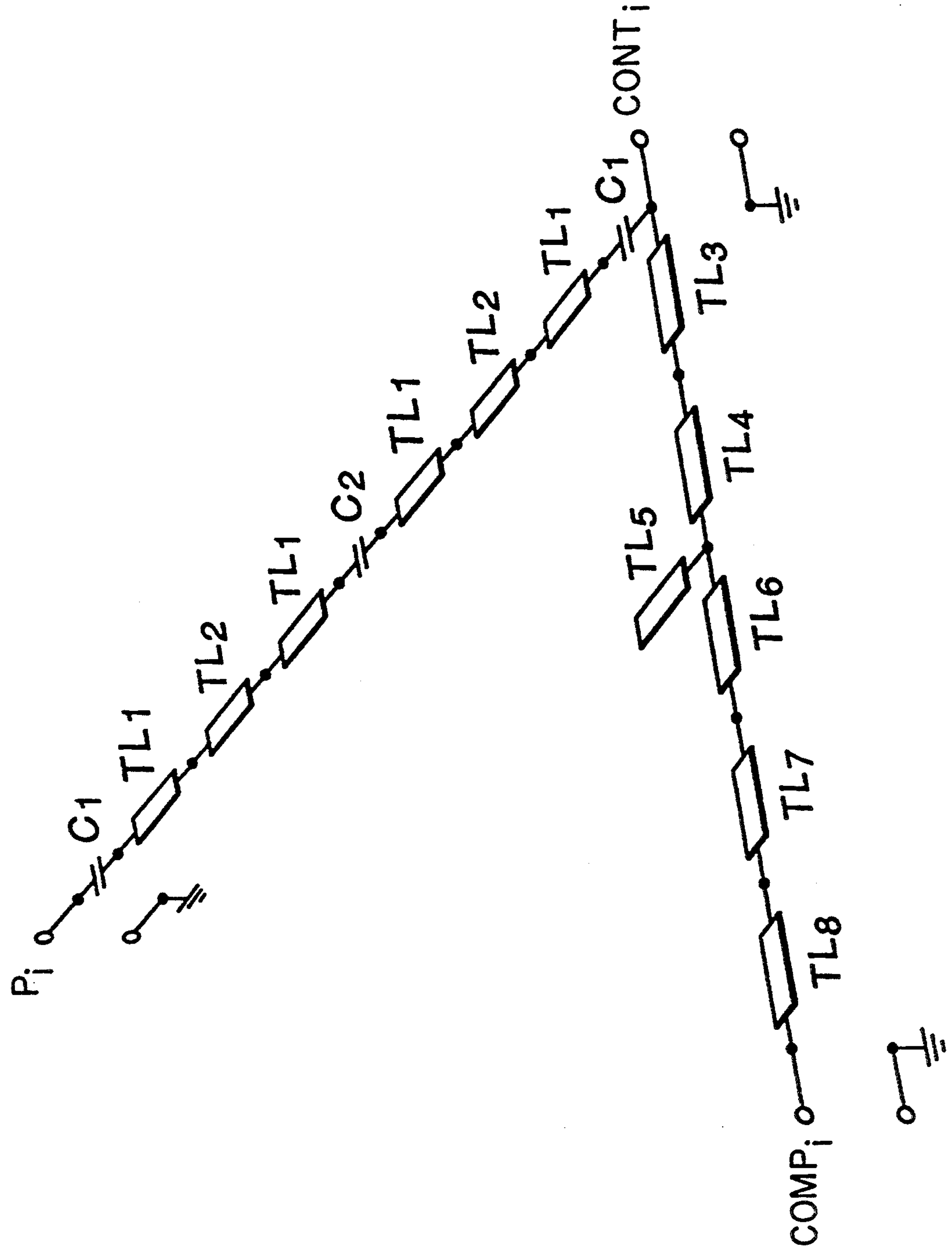
FIG. 3 is a schematic diagram of the structural configurations relating to a specific channel segment of the multiplexer of the present invention.

FIG. 3 is a schematic diagram of a multiplexer core segment for a first channel used to multiplex an 800-MHz bandwidth centered around a frequency of 6.4 GHz which was generated using conventional logarithmic-periodic techniques. The logarithmic-periodic technique generated the following parameter values for the elements of the first-channel core segment of the multiplexer according to the present invention to perform the multiplexing as described above. The electrical length at band center for transmission line $TL_1(\mathbf{1})$ was equal to 40°, for $TL_2(\mathbf{1})$ the length was equal to 45°, for $TL_3(\mathbf{1})$ it was equal to 8°, for $TL_4(\mathbf{1})$ it was equal to 38°, for $TL_5(\mathbf{1})$ it was equal to 45°, for $TL_6(\mathbf{1})$ it was equal to 6°, for $TL_7(\mathbf{1})$ it was equal to 36°, and for $TL_8(\mathbf{1})$ the length was equal to 8°. The impedances of the transmission lines were determined to be the following: for $TL_{1,3,4,6,8}$ the impedance was equal to 50 ohms, for $TL_{2,7}$ the characteristic impedance was equal to 100 ohms, and for $TL_5$ it was equal to 75 ohms. Finally, the capacitance $C_1(\mathbf{1})$ was equal to 0.151 pF and the capacitance $C_2(\mathbf{1})$ was equal to 0.0578 pF. Transmission line sections $TL_1$ and $TL_2$ together with capacitors $C_1$ and $C_2$ form a bandpass filter, and transmission line sections $TL_3$–$TL_8$ form a low-pass filter in the core segment as shown in FIG. 3. The element values for the remaining four core segments may be derived from the first-channel core segment using frequency transformations. For the 800-MHz-bandwidth multiplexer of the present invention, the frequency transformation involves various parameter scaling factors used for each of the core segments which is discussed in greater detail below.

Figure 4:
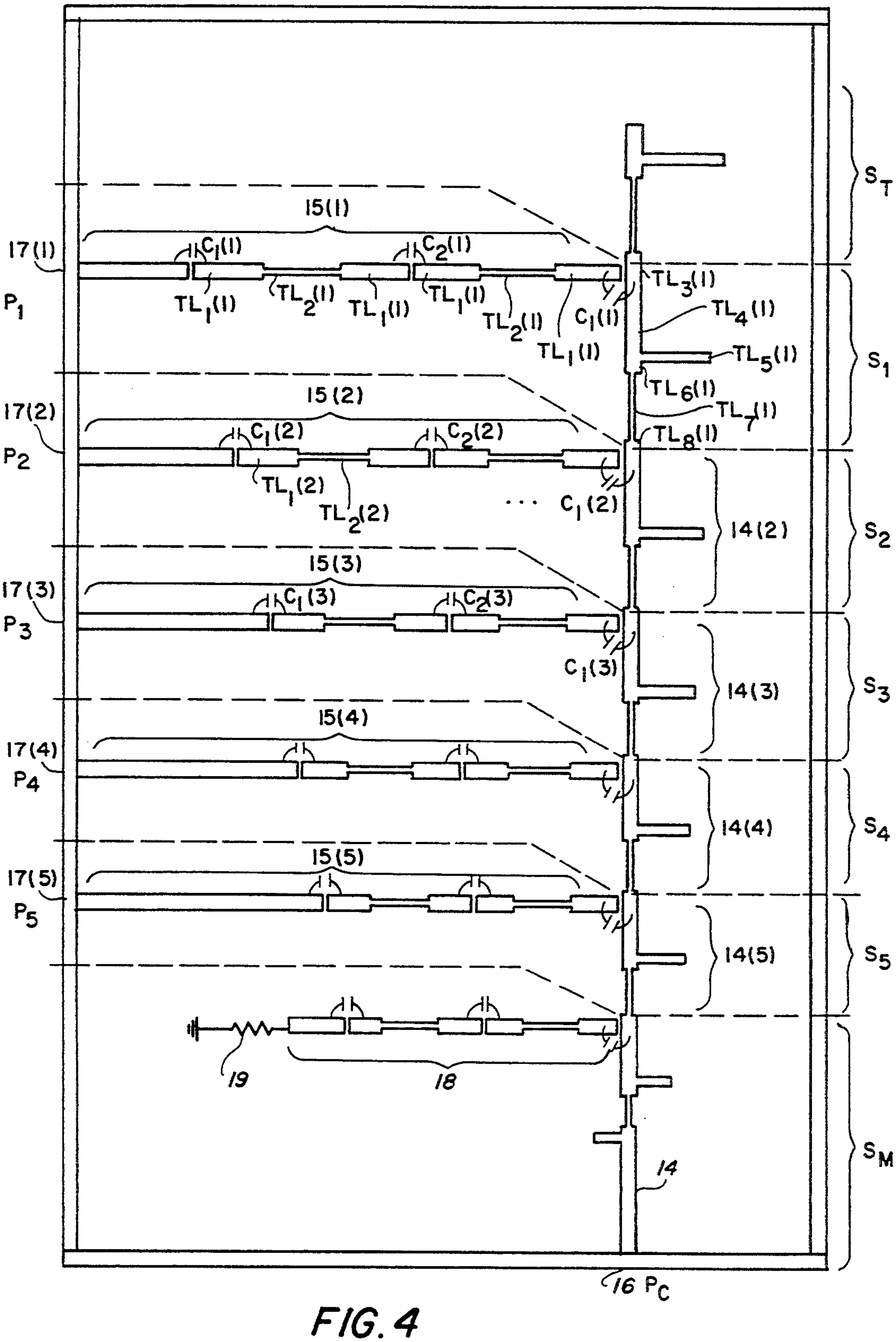
FIG. 4 is a diagram of the structural configuration of a five-channel contiguous-band constant-absolute-bandwidth multiplexer of the present invention having 800-MHz-wide channel bandwidths illustrating the principles of the present invention.

FIG. 4 shows the basic structure of the non-logarithmic-periodic multiplexer of the present invention. FIG. 4 thereby depicts the microstrip pattern layout for the non-logarithmic-periodic multiplexer implemented as conducting strips on a circuit board with a conducting ground plane on the back side of the circuit board. As indicated in FIG. 4, each of the core segments $S_1$–$S_5$ comprises the basic structure as described with reference to FIG. 3. In FIG. 4, an incident signal to be demultiplexed will enter a composite signal port 16 and propagate along trunk feeder section 14 until the signal reaches each of filters 14(5)–14(1). Trunk distribution filter networks 14(5)–14(1) are designed to have low-pass characteristics which encompass frequencies of the incident signal. From each of the trunk distribution filter networks 14(5)–14(1), respective frequency components of the signal are channeled off to channelized-signal ports 17(5)–17(1) via frequency-selective channelizing filters 15(5)—15(1). The present invention preferably uses conventional capacitively end-coupled strip resonator channelizing filters which are comprised of barbell combinations of three shorter transmission line segments that include a low-high-low characteristic impedance profile. The barbell structure is constructed by selecting the center strip line to have the highest realizable characteristic impedance, and each of the end sections to have the lowest realizable characteristic impedance. The actual selection process can be carried out with the aid of a computer. The conventional barbell configurations are shown in FIG. 4 as conventional strip resonator filters 15(1)–15(5). Capacitors $C_1$(1)–$C_1$(5) and $C_2$(1)–$C_2$(5) are preferably constructed with a dielectric between two conductive plates with gaps between strip resonator elements bridged with wire connections as described in the prior art.

To realize the multiplexer of the present invention, the non-logarithmic-periodic array of segments must be bounded in a reasonable manner. This can be accomplished by designing the composite-signal-port matching segment $S_M$ to mimic or simulate the two-port characteristics of an array extension with channel segments of monotonically increasing center frequencies and thereby establish proper impedance matching conditions at multiplexer composite-signal port 16. The matching segment $S_M$ preferably includes a continuation of the core segment array toward port 16 by at least one additional segment with respective channelizing filters terminated in dummy loads as represented in FIG. 4 by channel filter 18 and its load 19.

Termination segment $S_T$ in FIG. 4 is preferably an equivalent one-port substitution circuit which is used to mimic a diverging array of hypothetical core segments beyond the lowest frequency channel of interest, and to emulate for the core portion of the multiplexer the truncated portion of the segment array extended toward infinity. This equivalent circuit may simply be an open circuit or other conventional circuits described in the prior art.

As can be readily seen from FIG. 4, with reference to FIG. 1(*b*), the $B_i$ section channelizing filter 15(1)–15(5) includes conventional capacitively end-coupled barbell resonators comprised of transmission line sections $TL_1$ and $TL_2$ with small coupling capacitors $C_1$ and $C_2$ between each barbell section. Preferably, two resonators are used in each $B_i$ section channel filter, with higher-order filter structures to be used if enhanced channel selectivity is desired. Each $A_i$ section 14(1)–14(5) preferably comprises a filter structure such as the low-pass cascade connection in FIG. 3 of five transmission line segments, $T_{3,4,6,7,8}$, and an open ended transmission line stub $TL_5$. With the multiplexer structure of FIG. 4 being of the manifold type, sections $J_i$ are simple three-way parallel connections. No $C_i$ sections were used for the preferred embodiment of the multiplexer of the present invention shown in FIG. 4.

For microstrip implementation, the 5-channel non-logarithmic-periodic constant-absolute-bandwidth multiplexer of the preferred embodiment may preferably be constructed on a conventional 0.25-mm-thick fiberglass reinforced teflon surface or substrate. The small coupling capacitors between each strip section, i.e., $C_1$ and $C_2$, may preferably be made from conventional copper-clad 0.125-mm-thick fiberglass reinforced teflon as well.

Figure 5:
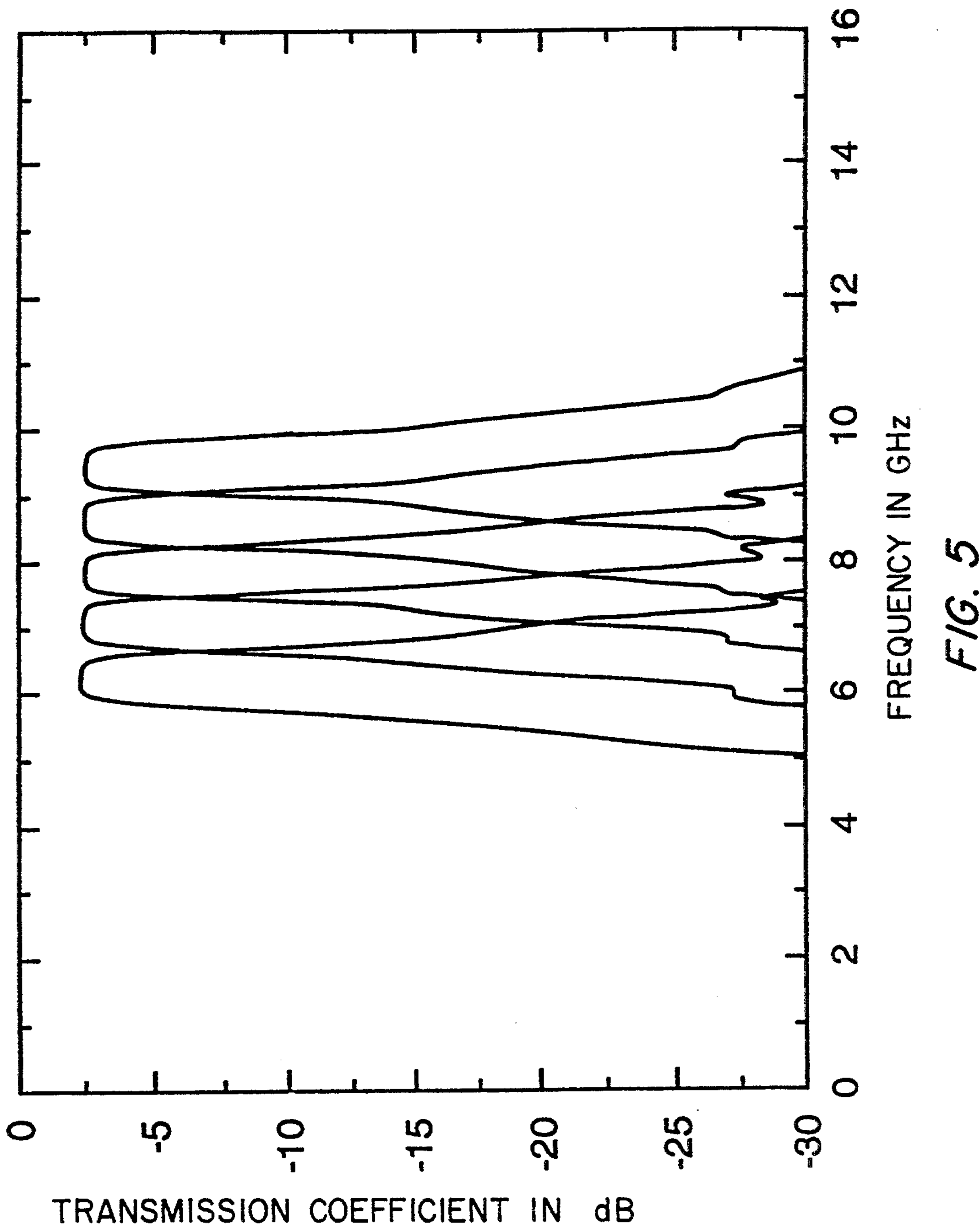
FIG. 5 is a diagram illustrating the calculated or simulated performance of the five-channel contiguous-band constant-absolute-bandwidth multiplexer of the present invention having 800-MHz-wide channel bandwidths.
Figure 6:
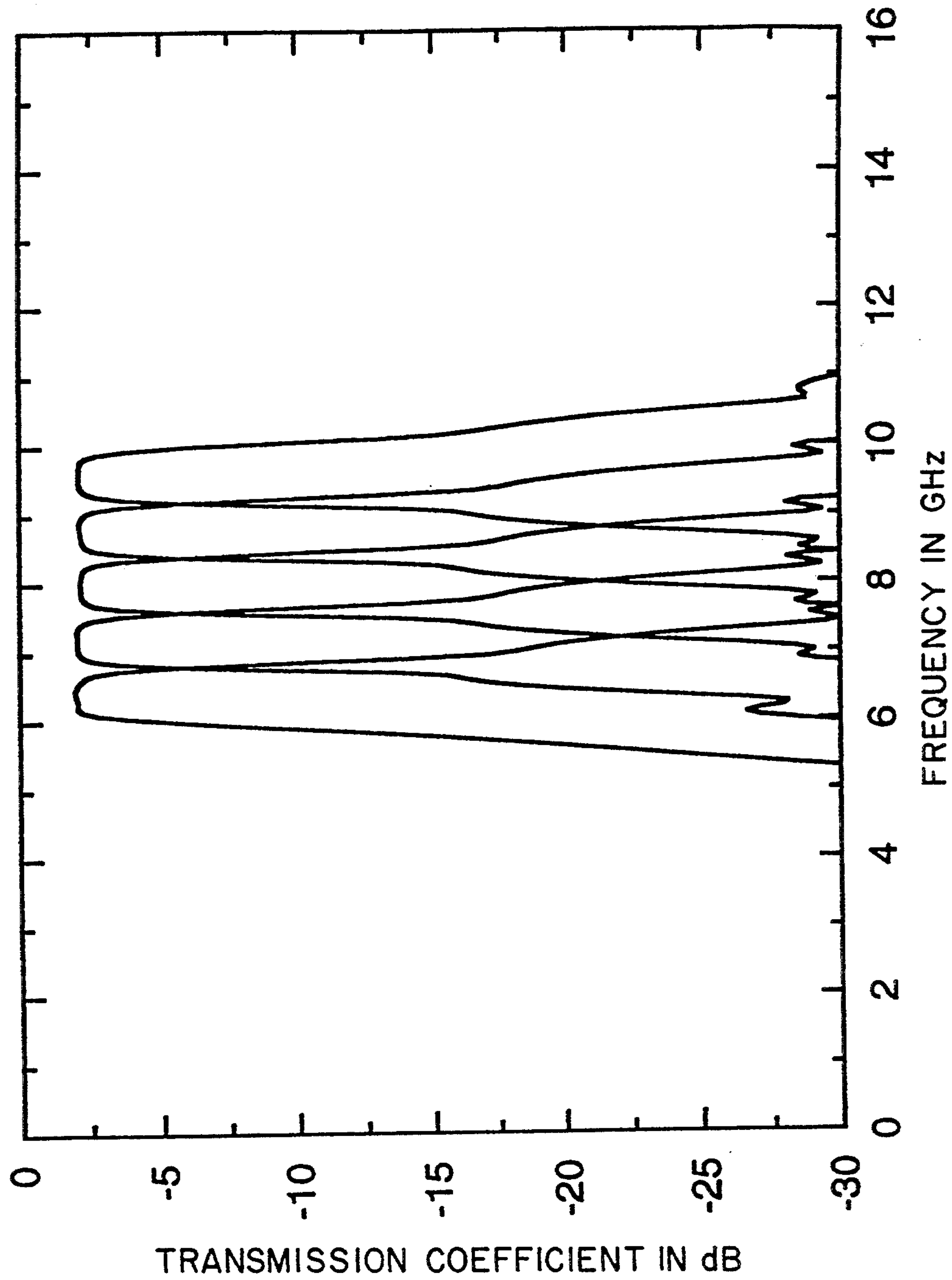
FIG. 6 is a diagram illustrating the actual performance measurements of the five-channel contiguous-band constant-absolute-bandwidth multiplexer of the present invention having 800-MHz-wide channel bandwidths.

FIGS. 5 and 6 show the measured and simulated performance of the non-logarithmic-periodic multiplexer circuit of the present invention shown in FIG. 4. As shown in FIG. 5, the measured performance of the 800-MHz constant-absolute-bandwidth multiplexer shown in FIG. 4 is in excellent agreement with the simulated performance of the 800-MHz constant-absolute-bandwidth multiplexer shown in FIG. 6.

Figure 7:
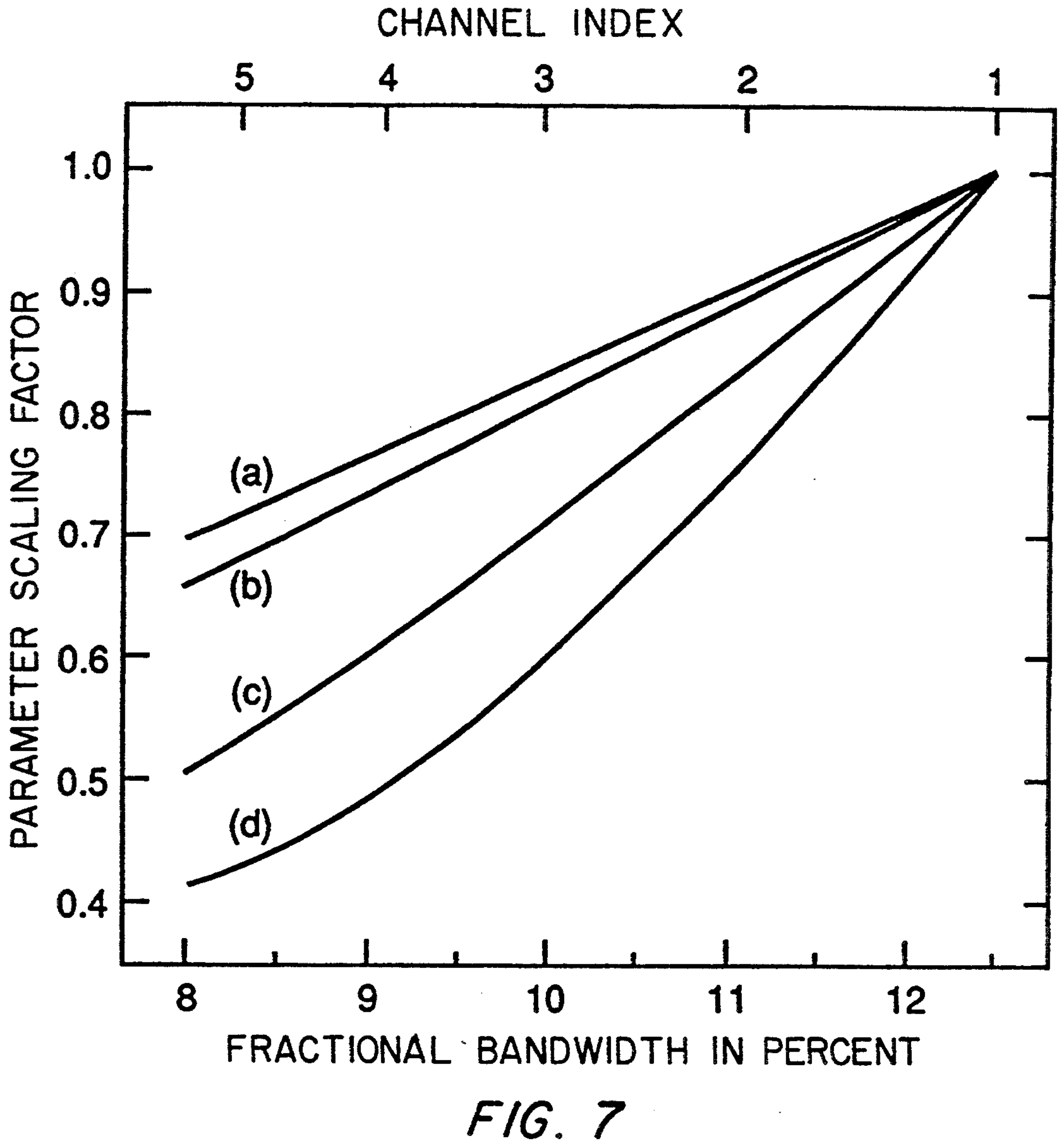
FIG. 7 is a diagram illustrating the various parameter values for each channel segment of the five-channel contiguous-band constant-absolute-bandwidth multiplexer of the present invention having 800-MHz-wide channel bandwidths, with all parameters normalized to those of a specific channel.

FIG. 7 is a graph of the channel segment parameters for each of the five channel segments of the non-logarithmic-periodic multiplexer shown in FIG. 4 normalized about the channel parameters for core segment one ($S_1$) of the 800-MHz constant-absolute-bandwidth multiplexer. Thus, a set Of parameter scaling factors may be defined for each core segment based upon the normalizing of parameters of core segments two through five $S_2$–$S_5$ about the parameters of core segment one $S_1$. As shown in FIG. 7, curve (*a*) depicts the normalized electrical lengths of transmission lines $TL_1$ and $TL_2$ in terms of their common parameter scaling factor versus or with respect to a specific core segment. Thus, the electrical length of $TL_1$(2) is equal to that of $TL_1$(1) multiplied by the parameter scaling factor which has been previously determined by normalizing all parameter values about the parameter values of core segment one $S_1$ as discussed above. Curve (*b*) is a graph of the normalized electrical length of the transmission lines $T_3$–$TL_8$ plotted as a function of channel index numbers one through five. In addition, curves (*c*) and (*d*) are graphs of normalized capacitances $C_1$ and $C_2$ given in terms of their respective parameter scaling factors versus specific channel index number. Note also that the specific fractional bandwidth in percent is also shown with respect to each of the above curves (*a*)–(*d*), in addition to these curves being plotted as a function of channel index numbers 1–5. Thus, if specific fractional bandwidths were desired for a particular non-logarithmic-periodic multiplexer of same general topology, the designer need only pick the transmission line lengths and capacitances corresponding to the desired fractional bandwidth off curves (*a*)–(*d*) shown in FIG. 7.

Conventional curve fitting techniques can also be used to closely approximate each parameter curve. Such techniques are of particular benefit if the resulting approximation functions derived for describing the transformation characteristics from one channel segment to another involve fewer transformation variables than there otherwise would be discrete scaling factor data points needed to represent the same transformation characteristics. For example, the logarithmic-periodic multiplexer has the transformation characteristic where $C(i)=T^{i-1}*C_1(1)$, $C_2(i)=T^{i-1}*C_2(1)$, etc. where T is equal to the parameter scaling factor for the logarithmic-periodic multiplexer which is the same for each channel segment parameter from one channel to the next. For a logarithmic-periodic design, all parameter transformations are hence simply and elegantly defined by a single transformation constant, namely T. In the case of a non-logarithmic-periodic structure of the present invention, this efficient feature is fully exploited through the use of the logarithmic-periodic multiplexer prototype circuits. The present invention also permits the pre-calculation of logarithmic-periodic multiplexer prototypes which may be compiled in, for example, a textbook, and which then permits the designer of the multiplexer to selectively choose transmission line lengths and capacitance parameters from a textbook based upon, for example, a desired fractional bandwidth. As for parameter transformations among segments of the actual non-logarithmic-periodic multiplexer structures, the respective curves, as illustrated by curves (*a*)–(*d*) in FIG. 7, are generally smooth and well-behaved and can typically be described by approximation functions with only one or two transformation variables in lieu of a number of scaling factor data points equal to or greater than the number of channels multiplied by the number of parameter sets—5 times 4 in the present example.

While FIGS. 3–7 apply the principles and features of the present invention to a preferred embodiment of an 800-MHz constant-absolute-bandwidth multiplexer, the present invention can also be applied to other non-logarithmic-periodic multiplexer applications as well. As discussed above, the multiplexer designer need only select the desired center frequency and bandwidth for each channel to be multiplexed/demultiplexed, and thereafter, simply design a logarithmic-periodic multiplexer prototype of suitable network topology for each of the channels to be multiplexed/demultiplexed. Then, the designer combines selected prototype segments as discussed above with a commensurate composite-signal-port matching network and a suitable array termination segment to form the non-logarithmic-periodic multiplexer.

A principal feature of the present invention, is the efficient utilization of logarithmic-periodic prototype structures in the design of a non-logarithmic-periodic microwave multiplexer circuit. The approach of the present invention, which is applicable in both the contiguous-band and non-contiguous-band situations is able to cope with an arbitrarily large number of channels while requiring only a minimum set of design variables. This design approach can also be used to accommodate specific bandwidth requirements. Thus, the present invention is not limited to contiguous-band multiplexers or multiplexers having a specified fractional channel bandwidth. Neither is the approach limited to multiplexers with manifold configurations.

A characteristic of the present invention is that the core segments used for the logarithmic-periodic prototype structures all have similar topologies with circuit element values linked from one core segment to another within a particular prototype structure via a scaling factor which typically differs from one prototype to the next. Consequently, the core segments of the final non-logarithmic-periodic multiplexer will also be of a common topology. Through derivation and subsequent utilization of above described core segment variable scaling functions, only a small set of parameters pertaining to specific core segments plus a few transformation coefficients are all that is essentially needed to define the multiplexer circuit in accordance with the principles of the present invention.

The resultant efficiency of the design method of the present invention is particularly significant in the design of sophisticated multiplexer circuits with a large number of channel segments. In addition, the non-logarithmic-periodic multiplexer circuit of the present invention (in a manifold configuration) also has the advantage of yielding better channel selectivity for a given substrate area than has been demonstrated by the prior art in view of the structure of the present invention which incorporates filtering networks in the trunk portions of the manifold (that is between respective connection points of the main channelizing filters) tasked with distribution of a multiplexer composite signal to the various main channelizing filters. Conventional computer-aided circuit design techniques may also be engaged to fine-tune the resulting design of the non-logarithmic-periodic multiplexer of the present invention and to synthesize an optimum composite-signal-port matching network and a low-frequency-end truncation network.

Any structure that meets the non-logarithmic-periodic structure of the present invention including different realizations for the branch filters, trunk network segment networks falls within the scope of the present invention. Alternative segment structures which may be used with this invention include structures that are not truly compatible with prototype logarithmic-periodic design constraints as they pertain to manifold type multiplexer realizations, but which may be termed quasi-logarithmic-periodic by being compatible with logarithmic-periodic prototype design within a limited frequency band. An example of such a structure is one that utilizes parallel-coupled-line filters with short-circuit resonator ends. Further, the present invention may also include feedback between nodes internal to each multiplexer segment, feedback or feedforward signal paths between nodes of different segments, and such paths between nodes of segments and the composite-signal-port matching circuit using conventional feedback and feed forward techniques and circuitry. Also feedback signal paths may be established feeding the channelized signal from the channelized-signal port to other ports in the multiplexer/demultiplexer and to the composite-signal port. Finally, the present invention may also include active circuit elements and devices as well as other nonreciprocal elements which are scaled in accordance with the non-logarithmic-periodic multiplexer frequency plan of the present invention.

The many features and advantages of the present invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly, all suitable modifications and equivalents may be resorted to falling within the scope of the present invention.

What is claimed is:

1. An apparatus comprising:

a plurality of core segments having a first and last core segment;

each core segment being further comprised of a first, second and third port, and each core segment being responsive to a different predetermined microwave signal;

said core segments, having electrically equivalent network topology, coupled in cascade through interconnection of respective first and third ports of adjacent core segments;

each core segment being further comprised of structural components responsive to a predetermined bandwidth and center frequency of a microwave signal, the structural components having parameter values determined through use of a logarithmic-periodic multiplexer technique;

in a demultiplexing mode of operation, said plurality of core segments are responsive to a composite signal applied to said first port of said last core segment, with the composite signal being comprised of a plurality of microwave signals, each microwave signal having a predetermined bandwidth and center frequency, each microwave signal being output as a channelized microwave signal through the second port of an associated core segment; and in a multiplexing mode of operation, each individual core segment is responsive to a microwave signal of a predetermined bandwidth and center frequency applied to the second port of the core segment, the microwave signals from said plurality of cascade coupled core segments being multiplexed and output at the first port of said last core segment.

2. An apparatus, as in claim 1, wherein each core segment is further comprised of a low-pass filter structure coupled between the first and third ports of the core segment.

3. An apparatus, as in claim 1, further comprising a composite-signal port connected to the first signal port of the last core segment and a means for establishing proper impedance matching conditions at the composite-signal port.

4. An apparatus, as in claim 1, further comprising a means for terminating said cascade of core segments coupled to the third port of the first core segment.

5. An apparatus, as in claim 1, wherein each microwave signal has a different fractional bandwidth.

6. An apparatus, as in claim 1, wherein the structural elements of adjacent core segments have element values that are monotonic functions of center frequency, and said core segments are cascaded according to a monotonic sequence of frequencies.

7. A microwave multiplexer for multiplexing a plurality of microwave signals or demultiplexing a microwave signal comprised of a plurality of microwave signals, each microwave signal having a predetermined fractional bandwidth, comprising:

a substrate;

a plurality of core segments having a first and last core segment fixed on said substrate and arranged in cascade comprised of circuit structural elements having parameter values determined through the use of a logarithmic-periodic multiplexer technique, and having a first, second, and third port, and responsive to a predetermined channel bandwidth and center frequency;

a composite-signal port coupled to the first port of said last core segment;

a low-pass filter coupled between the composite-signal port and the last core segment, and a low-pass filter coupled between the first and third ports of each core segment;

a plurality of channelized-signal ports, each channelized signal port coupled to an associated core segment through the core segment second port; and a termination structure coupled to the third port of the first core segment.

8. A microwave multiplexer for multiplexing a plurality of microwave signals or demultiplexing a microwave signal comprised of a plurality of microwave signals, each microwave signal having a predetermined fractional bandwidth, comprising:

a composite-signal port and a plurality of channelized signal ports;

a plurality of core segments coupled in cascade to the composite-signal port with a first core segment located fartherest electrically from the composite-signal port and a last core segment located electrically closest to the composite-signal port, each individual core segment being responsive to at least one microwave signal;

each core segment having a first, second and third port;

the second port of each individual core segment being coupled to an associated channelized-signal port;

the individual core segments being of a similar structure of passive, active, or a combination of passive and active circuit elements, said circuit structure defining a channelized-signal-port bandwidth response characteristic for each individual core segment, each individual core segment having a channelized-signal-port bandpass response differing from a channelized-signal-port bandpass response associated with any other individual core segment;

the core segments coupled to each other so as to produce a monotonic sequence of channel center frequencies among said plurality of channelized-signal ports, the last core segment being responsive to a highest center frequency;

impedance matching circuit coupled between the composite-signal port and the last core segment, comprising one or more impedance matching segments, wherein each of said impedance matching segments has a similar circuit structure as an individual core segment but is terminated in a dummy load rather than an associated channelized-signal port, said similar circuit structure being determined through the use of a logarithmic-periodic multiplexer technique for an infinite-array;

a termination circuit structure comprised of one or more termination segments coupled to the first core segment; and a low-pass filter coupled between the composite-signal port and the last core segment, and a low-pass filter coupled between the first and third ports of each core segment.

9. A microwave multiplexer for multiplexing a plurality of microwave signals or demultiplexing a microwave signal comprised of a plurality of microwave signals, comprising:

a composite-signal port;

a plurality of multiplexer core segments, having a first, second and third port, individual core segments arranged in cascade having a first and last core segment, the first port of the last core segment being coupled to the composite-signal port;

a plurality of channelized-signal ports, an individual channelized-signal port being coupled to the second port of an associated core segment;

each individual core segment having a structure responsive to a predetermined fractional channel bandwidth that differs from the fractional channel bandwidth of at least one other individual core segment;

the individual core segments having a similar circuit structure comprising active, passive, or a combination of active and passive circuit elements, but different circuit element parameter values defining a separate fractional channel bandwidth associates with each individual core segment; and the parameter values of the circuit elements of each individual core segment being determined by element values of a similar circuit determined through the use of a logarithmic-periodic multiplexer technique.

10. A microwave multiplexer for multiplexing a plurality of microwave signals or demultiplexing a microwave signal comprised of a plurality of microwave signals, each microwave signal of the plurality of microwave signals having a predetermined fractional bandwidth, comprising:

a composite-signal port;

a plurality of channelized-signal ports;

a plurality of individual core segments in cascade linking the composite-signal port to said plurality of channelized-signal ports;

each individual core segment being associated with a different microwave signal and further comprised of passive, active, and a combination of passive and active circuit elements for defining a response characteristic for the individual core element, each individual core segment having a plurality of segment signal ports of which at least one signal port is coupled to an associated channelized-signal port, one of said plurality of segment signal ports is coupled to a segment signal port of an adjacent individual core segment, each individual core segment having a similar circuit structure but comprised of circuit elements with differing circuit element parameter values;

circuit element parameter values for each individual core segment being determined through the use of a logarithmic-periodic multiplexer technique with separate circuit element parameter values being assigned to each individual core segment;

an impedance matching circuit coupled to the composite-signal port linking the composite-signal port to the segment port of the individual core segment electrically closest to the composite-signal port;

a termination circuit coupled to the individual core segment electrically fartherest away from the composite-signal port; and each individual core segment further comprising a low-pass filter structure coupled to at least one segment signal port of the core segment; and a bandpass filter having a predetermined center frequency and bandwidth coupled to a different segment signal port.

11. A method of multiplexing a plurality of microwave signals or demultiplexing a microwave signal comprising the steps of:

determining a common core element structure for a microwave multiplexer having a plurality of core segments by the use of a logarithmic-periodic multiplexer technique to determine a set of circuit parameter values for each core segment responsive to a microwave signal of a particular bandwidth and center frequency defining a specific fractional bandwidth, each core segment comprising active elements, passive elements, or a combination of active and passive elements, a plurality of ports for inputting and outputting a signal to an adjacent port;

arranging said core segments in cascade having a first and last core segment by coupling a third port of one core segment to a first port of the core segment next in cascade;

in a demultiplexing mode, inputting a composite signal, comprised of a plurality of signals, through a composite-signal port to the last core segment, extracting from the composite signal a signal that is a separate channelized signal responsive to an associated core segment, the channelized signal having a predetermined center frequency and a different fractional bandwidth, and outputting the channelized signal of each core segment through a second port to an associated channelized-signal port; and in a multiplexing mode, inputting a plurality of signals, each signal having a predetermined bandwidth, center frequency, and fractional bandwidth, through a plurality of channelized-signal ports, a signal being input into the channelized-signal port associated with said signal and applied to a second port of an associated core segment, and outputting said plurality of signals as a composite signal through a composite signal port.

12. A method, as in claim 11, further comprising the step of arranging said core segments in a order of monotonically increasing channel center frequencies.

13. A method, as in claim 11, further comprising the step of arranging said core segments in an order of decreasing center frequencies.

14. A method, as in claim 11, further comprising the step of filtering the composite-signal using a lowpass filter located between the composite-signal port and the last core segment.

15. A method, as in claim 11, further comprising the step of filtering said plurality of signals using a plurality of low-pass filters located selectively between the channelized-signal port and the associated core segment, between the first and third ports of each core segment, and between the composite-signal port and an adjacent core segment.

16. A method of constructing an apparatus, comprising the steps of:

selecting a composite microwave signal comprising a plurality of microwave signals having different center frequencies and specified bandwidths;

selecting a plurality of core segments composed of structural elements having values determined through the use of a logarithmic-periodic multiplexer technique, and each core segment structure of said plurality of core segment structures being responsive to a predetermined center frequency and selected bandwidth, and having a first port, a second port, a third port, and a plurality of internal nodes;

connecting said plurality of core segment structures in cascade by coupling the third port of one core segment to the first port of the core segment next in cascade; and connecting the second port of each core segment to an associated channelized-signal port for outputting a channelized microwave signal, the channelized microwave signal having a different center frequency from the channelized microwave signal output by any other core segment, and at least one channelized microwave signal having a fractional bandwidth different from any other channelized microwave signal output by any other core segment of said plurality of core segments.

* * * * *